Figure 1:
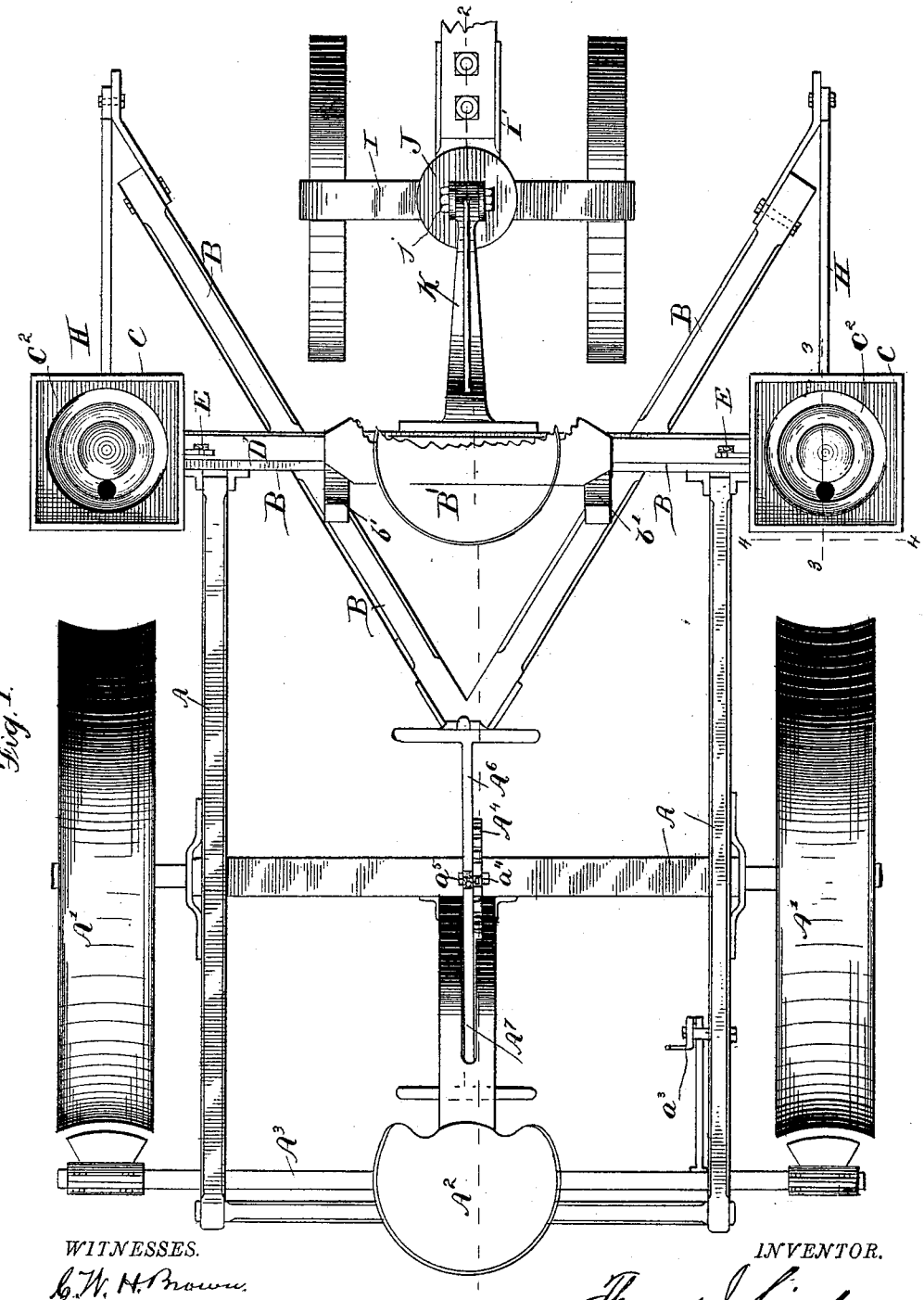

(No Model.) 3 Sheets—Sheet 1.

T. J. LINDSAY.
PLANTER.

No. 366,964. Patented July 19, 1887.

WITNESSES. INVENTOR.

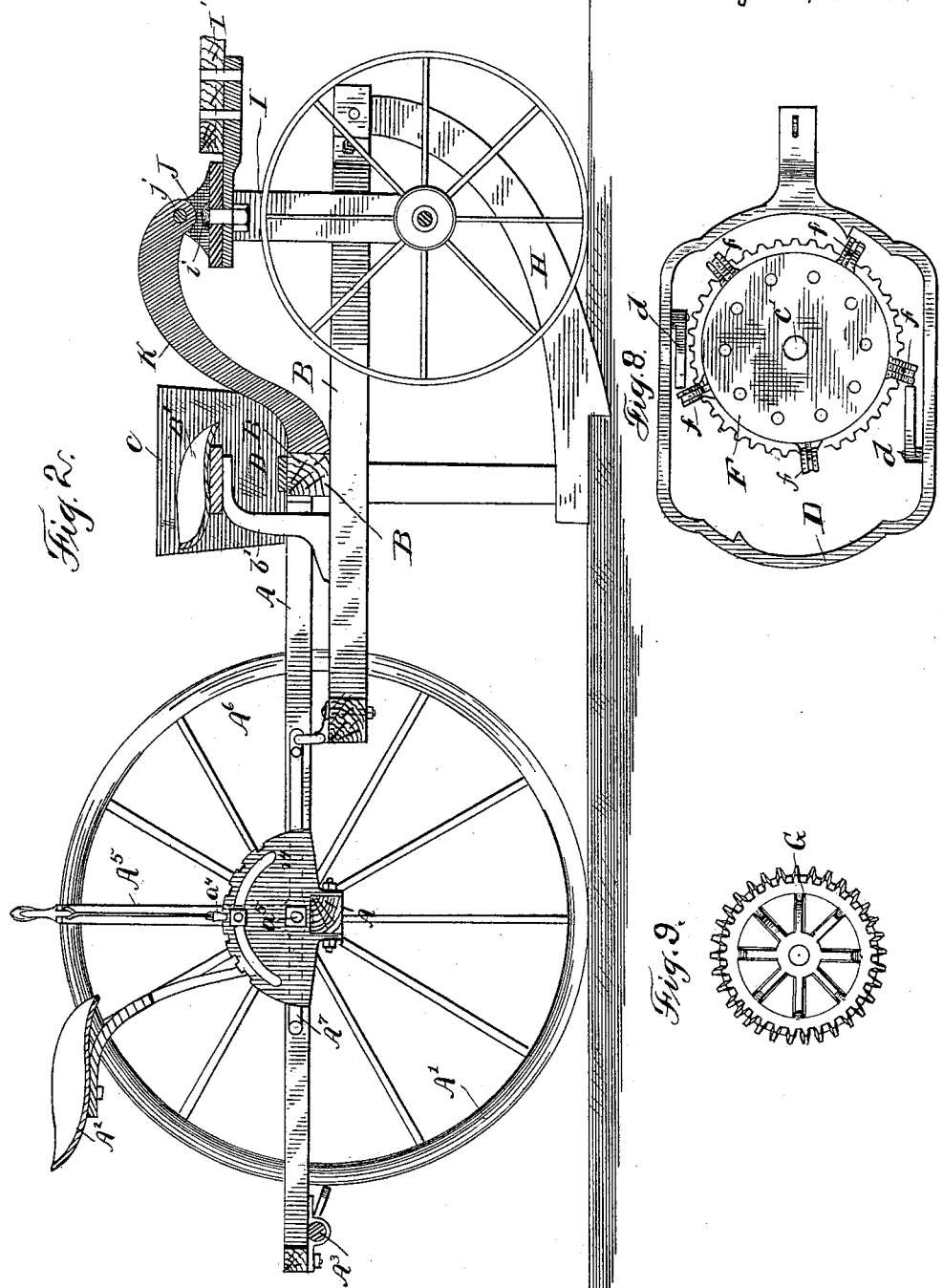

(No Model.) 3 Sheets—Sheet 3.
T. J. LINDSAY.
PLANTER.
No. 366,964. Patented July 19, 1887.
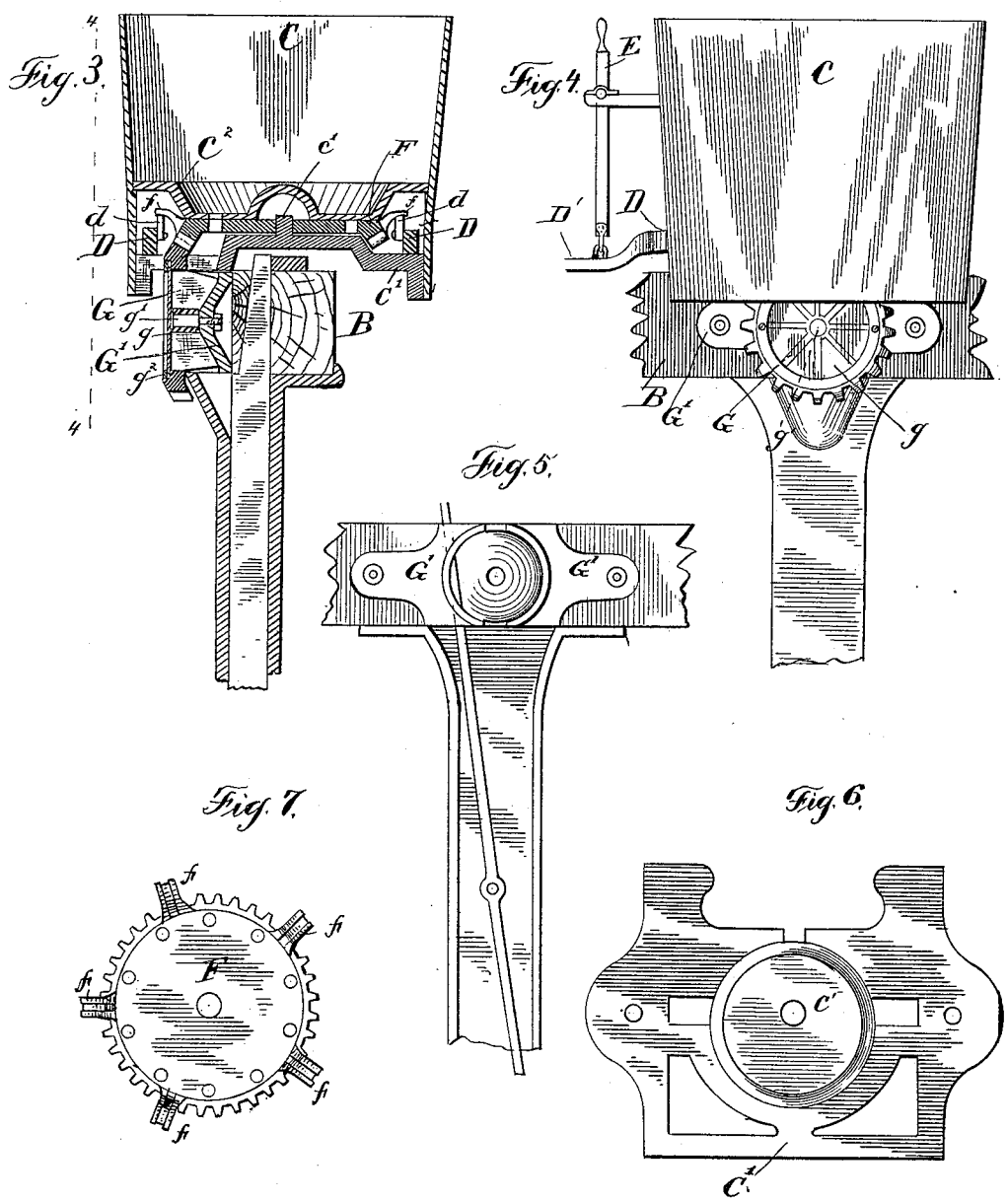
WITNESSES.
INVENTOR.

UNITED STATES PATENT OFFICE.

THOMAS J. LINDSAY, OF LAFAYETTE, INDIANA.

PLANTER.

SPECIFICATION forming part of Letters Patent No. 366,964, dated July 19, 1887.

Application filed January 20, 1887. Serial No. 224,874. (No model.)

*To all whom it may concern:*

Be it known that I, THOMAS J. LINDSAY, of the city of Lafayette, county of Tippecanoe, and State of Indiana, have invented certain new and useful Improvements in Planters, of which the following is a specification.

The objects of my said invention are to simplify and render more effective planters of the class which periodically drop hills of seed. In said invention the seed-dropping mechanism is made simple and efficient, the seed is exposed to view before being dropped into the ground, and the planter is so constructed that it may be turned or its course varied without causing the irregularity in the positions of the hills which such variation usually occasions.

The construction hereinafter described and claimed embodies these features, and it is illustrated as a machine in which the dropping mechanism is operated by hand by a person on the machine, but which may as well be operated by the ordinary check-rowing or any other automatic devices.

Referring to the accompanying drawings, which are made a part hereof, and on which similar letters of reference indicate similar parts, Figure 1 is a top or plan view of a corn-planter embodying my said invention; Fig. 2, a central vertical section of the same on the dotted line 2 2; Fig. 3, a detail sectional view through one of the seed-boxes on the dotted line 3 3, on an enlarged scale; Fig. 4, an elevation of said seed-box and adjacent parts as seen from the dotted line 4 4; Fig. 5, a similar view with the front plate removed from the feed-wheel and from the seed-spout; Fig. 6, a plan view of the stationary plate forming the lower portion of the seed-box; Fig. 7, a plan view of the revolving seed wheel or plate when in position on the central stud of that shown in Fig. 6; Fig. 8, a view of the reciprocating frame, which, by means of pawls, engages with and revolves said seed-wheel; and Fig. 9, a rear elevation of the wheel which carries the seed from where it is received from the seed-box to the seed-spout.

In said drawings, the portions marked A represent the main frame-work of the planter; B, the frame-work carrying the seed-boxes and feed mechanism; C, said seed-boxes; D, the frames which operate the revolving feed-wheels; E, a handle or lever for operating said frames; F, the feed-wheels; G, the conveyer-wheels, which convey the seed from the seed-wheels to the seed-spout; H, the plows or furrow-openers; I, a forward truck-frame; J, a plate mounted on a vertical pivot on said truck-frame and revoluble thereon, and K an arm extending forward from the frame B and connected to the plate J by a horizontal pivot.

The frame A may be of any desired construction capable of performing the work required. It includes the axle to the main wheels A', and has the seat A² for the driver mounted thereon. It also has a rock-shaft, A³, carrying scrapers, by which said main wheels may be cleaned, which rock-shaft is operated by a foot-lever, $a^3$, connected thereto by a connecting-rod, as shown in Fig. 1.

Upon the central portion of the axle is secured a segmental rack, A⁴, with which the catch $a^4$ on the lever A⁵ may engage. This lever is formed in one piece with a projecting arm, A⁶, and thus by operating said lever A⁵ said frames are adjusted relatively to each other. An arm, A⁷, also extends back from said lever, and each of said arms has a cross-piece at its extremity, by which the operator is enabled to assist the adjustment with his feet, as well as with his hands, through the lever A⁵. Said lever A⁵ and arms A⁶ and A⁷ are thus practically a triple lever, pivoted on the pivot-bolt $a^5$ and extending in three directions therefrom.

The frame B consists of the beam on which the seed-boxes and dropping mechanism are mounted, and two other beams running diagonally across it and coming to a point, where they are connected with the arm A⁶. The beam carrying the seed-boxes is also connected to the forward ends of the side bars of the frame A, the connection, however, being slotted, so as to permit a free vertical movement. Upon the center of this frame B is mounted the seat B', on which the person sits who operates the seed-dropping mechanism. Said seat is supported by arms $b'$, which extend up from the frame B, as shown in Figs. 1 and 2.

The seed-boxes C are located, as usual, in front of the main wheels A', and the bottom plates, C', of said boxes are secured rigidly to said frame. The particular form of said plates is shown in Fig. 6. Inside said feed-boxes is also secured another or upper plate, C², which covers the revolving feed-wheel. Between these two plates the feed-wheel revolves.

The frame D surrounds the feed-wheel F, and has two pawls, d, which are adapted, as said frame reciprocates, to alternately pass over and engage with projections f on said wheel, and thus move said wheel a space equal to one-half the distance between said projections at each motion, bringing a seed-cup into proper relation with the parts below to discharge the quantity of seed contained in one of said seed-cups. As will be noticed, the two frames are connected by a bar which extends across from one seed-box to the other, and thus both are operated at one movement.

The handle E is pivoted to the side of the seed-box C and extends down and engages in a suitable bearing on the arm D', and the operator is enabled by means of said handle to move said frame D back and forth, as will be readily understood.

The feed-wheel F is journaled on a central stud, c', on the plate C', and revolves thereon. It is provided with the projections f, with which the pawls d on the frame D engage, as has just been described. The under side of its outer edge is also provided with teeth, as shown, which render it in effect a bevel gear-wheel.

The wheel G has wide flat spokes, cupped at the bottom, and is mounted on a stud, g', extending out from the center of a conical cylindrical casing, G', which is secured to the cross-bar of the frame B, as shown particularly in Figs. 3 and 4. Its edge is provided with teeth, which make it in effect a bevel gear-wheel. These teeth engage with the teeth of the feed-wheel F, and thus as said wheel is moved this wheel G is also moved. Its outer surface is covered with a glass plate, g, which is secured thereon by a flange, g², and appropriate screws or pins, as may be desired. This glass face being exposed to the view of the operator of the machine, he is enabled to know with certainty that the dropping mechanism is operating perfectly, as there are at all times several "hills" of seed in sight, and it can thus be easily determined if the quantity of grains in each compartment is of substantially the same number as that in the other compartments, which is a very desirable result.

The plows or furrow-openers H are or may be of any usual construction and need no special description. Their character is sufficiently indicated by the drawings. The rear plate of the shank or spout of said furrow-opener, however, which extends up to the bottom of the feed-dropping mechanism, should have a channel in its upper end, which extends out beneath the wheel G to properly receive the seed therefrom, as indicated particularly in Fig. 3. It may be noticed here that the conical cylindrical casing G' has a slit in its edge, which registers with this channel, and a corresponding slit on its upper side, through which the seed drops from the seed-wheel F. Except for the interposition of the wheel G the seed would therefore drop directly from the wheel F into the spout or shank of the furrow-opener. The seed-wheel G thus holds the seed suspended and in sight of the operator, as before described.

The truck-frame I is mounted on the axle of a pair of truck-wheels, as shown, and the tongue I' to the machine is rigidly connected thereto. Said truck-frame receives the weight of the forward part of the machine, thus relieving the horses' necks from said weights.

The plate J is mounted on a stud or pivot-pin, i, on the truck-frame I, and is permitted to revolve freely horizontally thereon, and thus said truck-frame and the tongue are permitted to move to one side or the other without moving the planter proper. When it is considered that every movement of the team laterally in operating a planter as usually constructed varies the position of the seed-dropping mechanism, and to that extent throws the hills out of line, the importance of this arrangement will be understood.

The arm K is a rigid projecting portion fastened to the cross-bar of the frame B, and connected at its forward end by a horizontal pivot, j, to the plate J. By means of this pivoting the tongue can also be moved up and down, as well as laterally, without affecting the operation of the planter.

The operation of my improved planter may be recapitulated as follows: The parts being in position as shown in the drawings, the driver or operator in charge of the machine mounts the seat, and the check-rowing attachments are connected, or a person mounted on the seat B' operates the dropping mechanism. As said dropping mechanism is operated, the hills of seed are discharged one after another into the receptacles formed between the flat spokes of the wheel G, and are thus readily inspected. One pawl of the frame D being operated to engage when said frame is moved in one direction and the other to engage when it is moved in the other, each movement in a single direction operates the feed-dropping mechanism and starts a hill of seed from each of the seed-boxes on its way to the ground, and at the same time discharges a hill of seed previously started from each of the wheels G to the ground. By reason of the double pivoting of the planter to the vertical truck-frame any irregular movement on the part of the team will be without effect on the planter or seed-dropping mechanism. Such mounting also permits the planter to be turned in a very short circle.

Having thus fully described my said invention, what I claim as new, and desire to secure by Letters Patent, is—

1. The combination, in a seed-dropping mechanism, of a feed-wheel formed also as a bevel gear-wheel, and a second wheel having wide spokes, the spaces between which form seed-cups, and which is also formed as a bevel gear-wheel and arranged to mesh with said feed-wheel, whereby it may be operated from said feed-wheel, substantially as set forth.

2. In a planter, a wheel, G, having wide spokes fitting inside a casing, G', and provided with a glass face, thus forming an intermediate seed-receptacle in which the hills of seed will be temporarily held and wherein they may be inspected on their passage from the usual feed-dropping mechanism to the ground, said wheel being geared to and driven by the feed-wheel of the planter, substantially as set forth.

3. The combination, with a planter, of a truck having a part mounted on a vertical pivot on its frame, and said planter being connected to said truck by an arm pivoted to said part by a horizontal pivot, whereby both a vertical and sidewise swing are allowed said truck without changing the position of the planter, substantially as set forth.

4. The combination of the frame A, the frame B, a rack, a lever by which the relative position of said two frames may be adjusted, a seed-dropping mechanism on said frame B, a forward truck-frame having a horizontally-revolving plate, and an arm extending from said frame B to said revolving plate and pivoted thereto by a horizontal pivot.

5. The combination of the main frame of the planter, an adjustable frame connected thereto and carrying the seed-dropping mechanism, a forward truck-frame connected to said adjustable frame by a vertical and a horizontal pivot, and a tongue extending forward from said truck-frame.

6. The combination, in a planter, of the main frame, an adjustable frame carrying seed-dropping mechanism connected thereto and supported in front by a truck-frame, to which it is connected, a triple lever, $A^5$ $A^6$ $A^7$, and a catch and segmental rack for holding said lever in position.

In witness whereof I have hereunto set my hand and seal at Lafayette, Indiana, this 11th day of January, A. D. 1887.

THOMAS J. LINDSAY. [L. S.]

In presence of—
  C. H. COMSTOCK,
  C. E. BASTIAN.